Patented Sept. 13, 1949

2,481,537

UNITED STATES PATENT OFFICE 2,481,537

PROCESS FOR RECTIFICATION OF CRUDE ALKALOIDS

Silvio E. Ronzone, Placerville, Calif., and Norman Applezweig, New York, N. Y.

No Drawing. Application April 25, 1946, Serial No. 664,869

2 Claims. (Cl. 260—284)

(Granted under the act of March 3, 1883, as amended April 30, 1928; 370 O. G. 757)

The invention described herein may be manufactured and used by or for the Government for governmental purposes, without payment to us of any royalty thereon.

This invention relates to rectification of alkaloids, and it is particularly directed to a process for rectifying totaquine.

In the copending application of Applezweig, Kaye and Ronzone, filed April 25, 1946, and bearing Serial No. 664,868, a process was described for extracting alkaloids, particularly totaquine from fresh cinchona bark. This process broadly comprises leaching the alkaloids with an acid solution to form an alkaloid salt solution, depositing the alkaloids on an ion exchange material, converting the alkaloids to the bases, and stripping the alkaloids from the ion exchange material with a solvent. When the alkaloids are recovered from the solvent and concentrated to dryness, there is a relatively high percentage of impurities therein. When rectified, totaquine is usable as an antimalarial. Accordingly, this invention is for a process of rectification of alkaloids with a minimum loss of the alkaloid.

Crude alkaloid, such as the totaquine described above and in the patent application of reference, is dissolved in acid. The alkaloid salt solution is then carefully adjusted in pH with an alkali until the extraneous material precipitates out of solution. With cichona alkaloids a pH of 6.5 is the acidity at which extraneous materials will precipitate out of solution and may be removed. Little, if any, of the cinchona alkaloids precipitate at this pH. After removing the extraneous materials, the pH of the solution is further raised until a heavy white precipitate appears, usually at a pH of 7.5 to 8.0. This precipitate is removed and constitutes the alkaloid. The filtrate is reacidified and circulated through an ion exchanger, where the alkaloid is deposited on the exchange material. The alkaloids are converted to the bases and stripped from the exchanger with a solvent. In continuous operation the losses from the solubility of the natural bases are greatly reduced. If desired, the rectification process can be repeated to obtain increased purity of product.

Both mineral and organic acids in all concentrations may be used hot or cold in the acidification step of the process. It has been determined, however, that better results are obtained when hydrochloric or sulfuric acid in one normal strength is used.

Any suitable alkali, such as sodium hydroxide, in concentrations capable of fine degree titration control, may be used as an alkalizing agent. Since the equipment may have copper or nickel exposed to the solution, ammonium hydroxide is a very satisfactory alkalizing agent since any contamination by copper or nickel will remain in solution when the alkaloids are precipitated.

More specifically, the process may be described as follows: An excess of crude totaquine is introduced into a solution of one normal hydrochloric acid contained in a suitable vessel. After several hours of agitation by means well known in the art, the solution is filtered and the undissolved totaquine removed from the filter and saved for a subsequent rectification. The filtrate is then carefully adjusted with ammonium hydroxide to precipitate extraneous material. Care should be exercised to avoid adjusting the pH in excess of 6.5, because some of the alkaloid will precipitate out of solution and be lost with the waste. From experience it has proved very satisfactory to adjust the pH to 6.5 when working with totaquine. The solution is again filtered to remove the precipitated extraneous materials on the filter. The filtrate is further treated with ammonium hydroxide until a heavy white floc of totaquine appears, usually at a pH of 7.5 to 8.0. This floc, totaquine, is removed by filtration, with the filtrate subjected to further treatment for recovery of the alkaloids remaining in solution. The treatment of the filtrate comprises heating to drive off the excess ammonia, reacidifying with hydrochloric acid to a pH of 4 to 5, and depositing the alkaloids in an ion exchanger, which is preferably of the carbonaceous or resinous cation exchange type.

The ion exchanger may be placed in an alkaloid extraction process and the deposited alkaloid stripped with more alkaloid deposited during a subsequent extraction process. Preferably, however, the filtrates from several rectifications are saved and recirculated, upflow, through an ion exchanger until the influent shows a negative Mayer's test. Then the exchanger is treated with an alkali, such as sodium hydroxide of one-tenth normal strength, in sufficient quantity to replace the alkaloid ions with sodium ions. The excess alkali is removed from the exchanger with a fast water rinse. The resulting alkaloid bases are stripped from the exchanger with a suitable solvent such as ethyl alcohol recirculated upflow through the exchanger. The alkaloids are recovered from the solvent by distillation and concentrated to dryness by the application of heat.

The above process may be repeated to obtain a high degree of purity in the product, if desired.

Having thus described our invention, what we claim as new and wish to secure by Letters Patent is:

1. A process for rectifying crude totaquine comprising forming a saturated solution of said totaquine in one normal hydrochloric acid, adjusting the pH of the saturated solution upwardly with ammonium hydroxide to 6.5, filtering to remove the precipitated extraneous materials, treating the filtrate with ammonium hydroxide to raise the pH between 7.5 and 8.0, removing the precipitated totaquine by filtration, reacidifying the filtrate, and directing it through an ion exchanger, passing an aqueous solution of an alkali through the exchanger until the ion exchange material is alkaline and the alkaloids thereon are converted into their natural bases, stripping the alkaloid from the exchanger with ethyl alcohol, and recovering the alkaloid from the alcohol.

2. A process for rectifying crude totaquine comprising forming a saturated solution of said totaquine in one normal hydrochloric acid, adjusting the pH of the saturated solution upwardly with ammonium hydroxide to 6.5, filtering to remove the precipitated extraneous materials, treating the filtrate with ammonium hydroxide to raise the pH between 7.5 and 8.0, removing the precipitated totaquine by filtration, reacidifying the filtrate and directing it through an ion exchanger, converting the alkaloids to bases with alkali by passing an aqueous solution of an alkali base through the ion exchanger until the alkaloid-bearing bed of ion exchange material contained therein becomes alkaline and the alkaloids are converted to their natural bases, stripping the alkaloid from the exchanger with ethyl alcohol, and recovering the alkaloid from the alcohol.

SILVIO E. RONZONE.
NORMAN APPLEZWEIG.

REFERENCES CITED

The following references are of record in the file of this patent:

UNITED STATES PATENTS

| Number | Name | Date |
|---|---|---|
| 378,233 | Casamajor | Feb. 21, 1888 |
| 1,048,712 | Lloyd | Dec. 31, 1912 |
| 1,300,747 | Lloyd | Apr. 15, 1919 |
| 1,548,566 | Volck | Aug. 4, 1925 |
| 2,293,954 | Tiger et al. | Aug. 25, 1942 |
| 2,462,782 | Shohan | Feb. 22, 1949 |

FOREIGN PATENTS

| Number | Country | Date |
|---|---|---|
| 1,472 | Great Britain | 1884 |
| 805,092 | France | Aug. 17, 1936 |

OTHER REFERENCES

Waldbott, J. Am. Chem. Soc. 27, 8 (1905) [Cited as references 12, in Ind. & Eng. Chem. 38, 576–579 (1946)].

J. Am. Chem. Soc. 66, 1990 (1944).